June 5, 1928.
H. M. EWING
1,672,486
BRAKE BAND STRUCTURE
Filed April 11, 1927   2 Sheets-Sheet 1
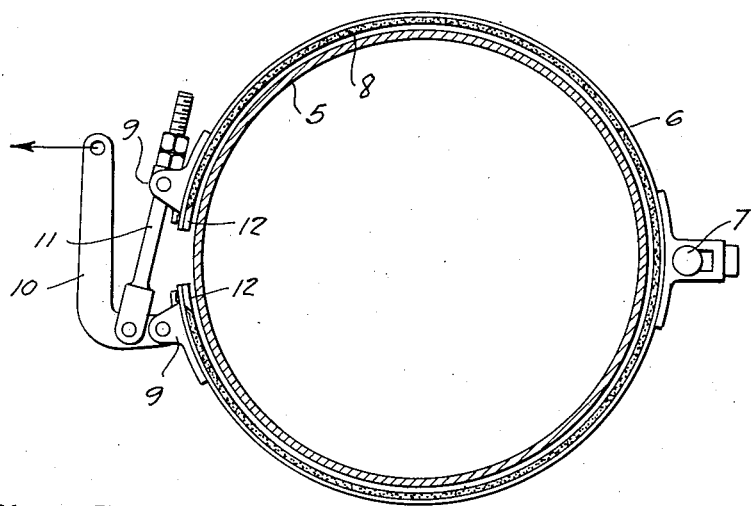
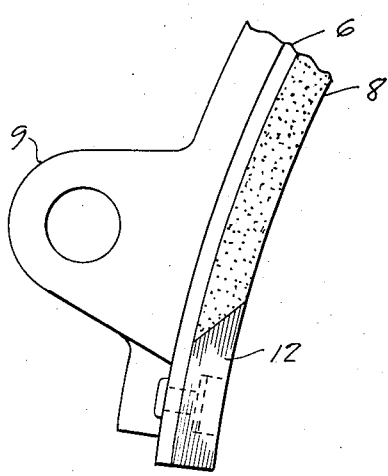
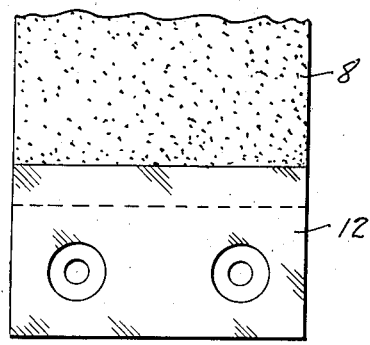
INVENTOR.
Howard M. Ewing
BY Westall and Wallace
ATTORNEYS.

June 5, 1928.

H. M. EWING

BRAKE BAND STRUCTURE

Filed April 11, 1927

1,672,486

2 Sheets-Sheet 2

INVENTOR.
Howard M. Ewing
BY Westall and Wallace
ATTORNEYS.

Patented June 5, 1928.

1,672,486

UNITED STATES PATENT OFFICE.

HOWARD M. EWING, OF LOS ANGELES, CALIFORNIA, ASSIGNOR TO MINERVA PICTURES CORPORATION, OF LOS ANGELES, CALIFORNIA, A CORPORATION OF CALIFORNIA, DOING BUSINESS UNDER THE FICTITIOUS NAME OF STANDARD AUTOMOTIVE AND MACHINE WORKS.

BRAKE-BAND STRUCTURE.

Application filed April 11, 1927. Serial No. 182,568.

This invention relates to brake structures of the type in which a metallic brake drum is engaged by a brake member having wear and heat resisting lining secured on its surface, and has for its objects to improve the operation of such brakes, increase the life of the lining, and especially to provide for noiseless operation.

Figure 3:
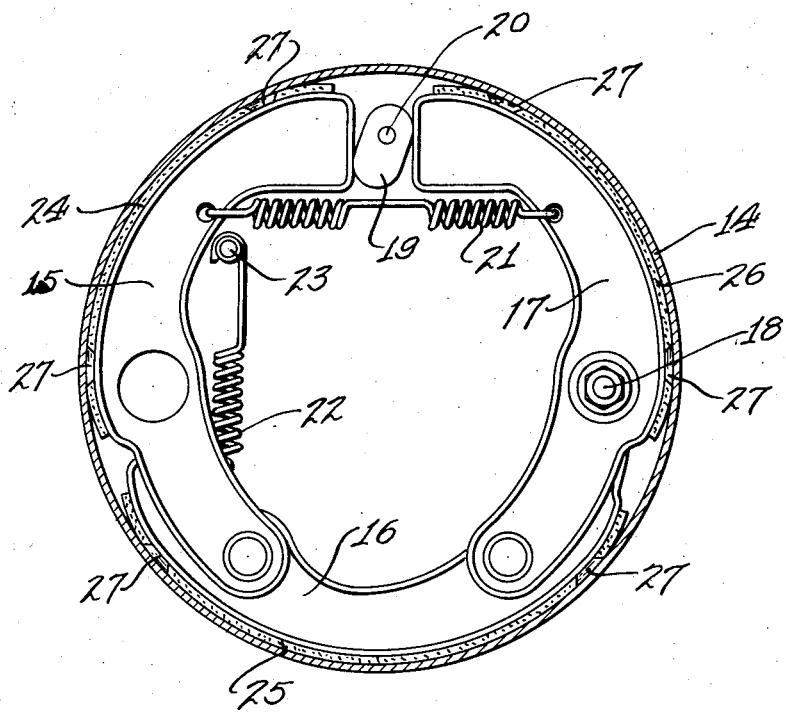
Figure 4:
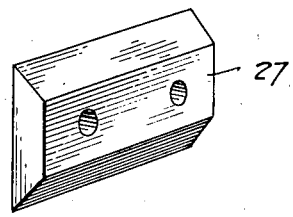

These objects together with other objects and corresponding accomplishments are obtained by means of the embodiment of my invention illustrated in the accompanying drawing in which:

Fig. 1 is an elevation of an external brake of a type widely used on automotive vehicles, the brake drum being shown in section; Fig. 2 is an elevation on an enlarged scale of one end of the band; Fig. 2ª is an elevation of the end of the band shown in Fig. 2, looking from the inside of the band; Fig. 3 is an elevation of a well known type of internal brake with the brake drum shown in section; and Fig. 4 is a perspective view of an insert for the brake lining of Fig. 3.

Referring more particularly to Figs. 1 to 2ª, the brake drum is denoted by 5 and is secured in any desired way to a suitable revolving part of the mechanism (not shown). The brake band is indicated by 6 and is supported by a pin 7 fixed to a stationary part of the mechanism. The band has the usual brake lining 8 secured to it by rivets, and brackets 9 at its ends are also secured to it by rivets. Pivotally secured to the lower bracket is a bell crank 10 arranged to have a brake pull rod secured to its outer end. It has a forked rod 11 pivotally secured near its lower end, this rod having a bearing in the upper bracket and being threaded and provided with nuts for adjustment. When the bell crank is moved in the direction of the arrow, the lower portion of the bank is moved up against the drum and the upper part is moved down against it. This is a typical brake, and while there may be various means to insure release, or means to carry the weight of the band free of the drum added, the essentials are the same.

In the operation of such a brake, the pull exerted on the brackets has a tendency to bend the ends of the band inwardly. This results in increased pressure and a tendency to bend the ends of the band inward toward the drum with a resultant increased wear on the lining at the ends. As it is common practice to stop the lining some distance from the ends of the band, these ends sometimes come in contact with the drum when the brake is applied. This is a frequent cause of squeaks and scored drums. Furthermore, the exposed ends of the lining offer a lodging place for stones, dirt and other foreign matter which also tends to cause scored drums and give unequal braking.

My improved brake structure contemplates a brake band as previously set forth but with the addition of blocks of metal preferably of an alloy including copper, lead and graphite indicated by 12 attached by rivets at the ends of the band, the rivet heads being in a counterbore. The edge of the block adjacent the lining is bevelled, and the brake lining is correspondingly bevelled, so as to be held down by the block. These insert blocks or tips anchor the lining and furnish support for the ends of the band and keep it from bending and exerting excess pressure on the portion of the lining near the ends. They also prevent the ends of the lining loosening, and as the outer surface is smooth and flush with the end of the band there is no chance for dirt to collect.

Some forms of brakes have a portion of the band near the supporting pin without lining and in such cases it would be necessary to install two tips or inserts at the inside ends of the lining in addition to those at the outside ends.

Referring more particularly to Figs. 3 and 4, an internal brake of the servo type is disclosed. A brake drum is indicated by 14. Mounted therein is an expansible member comprising a primary shoe 15 pivotally secured to a secondary shoe intermediate the ends of the latter. Pivotally secured to the secondary shoe 16 is an auxiliary 17. The auxiliary shoe is pivotally mounted upon a pin 18 which is stationary and in practice may be secured to the backing plate. The primary shoe and auxiliary shoe have a gap, in which is mounted a cam 19 secured to an operating pin 20. A spring 21 is secured at one end to the auxiliary shoe and at the other end to a primary shoe, serving as a primary return spring. A secondary return spring 22 is secured at one end to the secondary shoe and at the other end to a pin 23 which is stationary. Each of the shoes is provided with linings as indicated by 24, 25 and 26. In the operation of the brake, the cam 19 is turned so that the long end bears against the primary shoe and the short end against the auxiliary shoe. This causes the shoe member to expand in a well known manner. The points at which the shoes bear with greatest pressure against the brake drum and tend to dig therein are adjacent the ends of the linings. At these points the metal blocks are inserted. The inserts are indicated by 27. As shown in Fig. 4, these inserts are bevelled so that the edges will overlap the brake lining and tend to hold the latter in place.

It will be noted that the inserts aid in transmitting a uniform frictional thrust over the entire brake lining. The latter being relatively soft, if unaided would have a tendency to grab the drum in spots, causing squeaks, chattering and noise by reason of the vibration set up. The inserts being of anti-friction material sliding with substantially no friction against the drum compel the lining of brake bands to wrap the drum with a uniform pressure. This results in even wear, increased life and smooth application of the brake.

What I claim is:

1. A divided bendable brake member for engagement with a drum including a relatively soft brake lining secured to said member, and tips of anti-friction metal for the ends of said lining.

2. A flexible brake band for engagement with a drum including a brake lining secured to said band, and tips of anti-friction metal for the end of said lining.

3. Inserts for brake linings comprising blocks of anti-friction metal having bevelled ends adapted to overlap correspondingly bevelled ends of linings.

4. The combination with a brake drum of a brake member therefor, a fabric lining for said brake member, and inserts of anti-friction metal in said lining.

In witness that I claim the foregoing I have hereunto subscribed my name this 1st day of April, 1927.

HOWARD M. EWING.